United States Patent
Ross et al.

Patent Number: 5,337,054
Date of Patent: Aug. 9, 1994

[54] COHERENT PROCESSING TUNNEL DIODE ULTRA WIDEBAND RECEIVER

[75] Inventors: Gerald F. Ross, Longboat Key, Fla.; Richard M. Mara, Tewksbury, Mass.

[73] Assignee: Anro Engineering, Inc., Lexington, Mass.

[21] Appl. No.: 885,300

[22] Filed: May 18, 1992

[51] Int. Cl.$^5$ ............................................. G01S 7/34
[52] U.S. Cl. ................................... 342/93; 342/91; 342/205
[58] Field of Search ................ 342/93, 89, 91, 92, 342/205

[56] References Cited

U.S. PATENT DOCUMENTS

| | | | |
|---|---|---|---|
| 3,832,543 | 8/1974 | Green et al. | 359/194 |
| 3,938,145 | 2/1976 | Brook et al. | 342/26 |
| 4,041,412 | 8/1977 | Malone | 331/10 |
| 4,150,375 | 4/1979 | Ross et al. | 342/21 |
| 5,084,706 | 1/1992 | Ross et al. | 342/368 |

Primary Examiner—John B. Sotomayor
Attorney, Agent, or Firm—George Grayson

[57] ABSTRACT

A four-terminal network in tandem with a tunnel diode (TD) threshold receiver currently used in radar or communications improves its sensitivity. Previous inventors have shown that the temperature and sensitivity properties of a conventional TD threshold device used for detecting very short duration bursts of microwave energy would be enhanced by appropriately biasing the TD by a current derived from the thermal noise; the current sets the TD operating point. The magnitude of the current is determined by a constant false alarm rate (CFAR) feedback loop. The subject invention recognizes that a TD changes states (i.e., a detection event) when the area under the current vs. time curve or the charge passing through the device exceeds a prescribed number of picocoulombs. To maximize the charge and improve detection, a form of superheterodyne conversion is introduced to convert the oscillatory short pulse microwave signal received by an antenna to a monopolar baseband signal. This is done by mixing the incoming signal with a CW carrier whose frequency is precisely chosen so that the resulting beat frequency is one-half of an rf cycle for the given duration of the microwave burst. This maximizes the charge available to trigger the TD. Proper gain and filtering is provided in the adjunct four-terminal network to establish minimum noise figure and appropriate gain to drive the TD held in a CFAR loop. It is shown both mathematically and experimentally that the subject invention can increase the receiver sensitivity by a factor of 20 dB or greater over the prior art. Proper microwave gain is provided to establish the noise figure prior to mixing in the added four-terminal network and a bandpass filter is employed to discard frequency components and the gain of a wideband IF (e.g., 0–500 MGz) is selected to appropriately drive the TD.

10 Claims, 5 Drawing Sheets

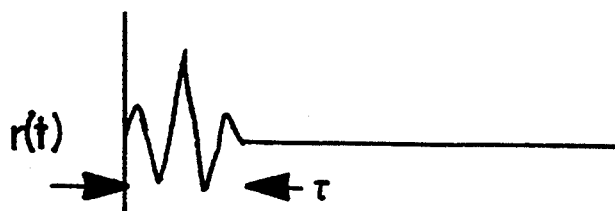
FIG. 7a  r(t)
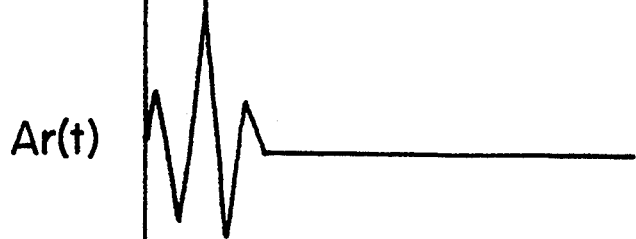
FIG. 7b  Ar(t)
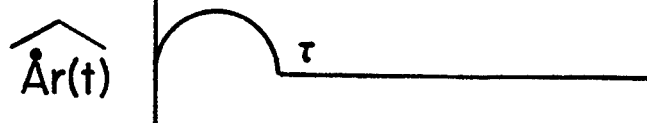
FIG. 7c  $\widehat{Ar(t)}$
FIG. 7d  $\widehat{ABr(t)}$

COHERENT PROCESSING TUNNEL DIODE ULTRA WIDEBAND RECEIVER

REFERENCED PATENTS (1) U.S. Pat. No. 5,084,706; issued Jan. 28, 1992, entitled, "Synchronization of Very Short Pulse Microwave Signals for Array Applications", by Gerald F. Ross and Richard M. Mara.

(2) U.S. Pat. 3,755,696; issued Aug. 28, 1973, entitled "Detector Having a Constant False Alarm Rate and Method for Providing Same", by Alexander M. Nicolson and Robert J. Brophy.

(3) U.S. Pat. 3,983,422; issued Sep. 28, 1976, entitled, "Detector Having a Constant False Alarm Rate", by Alexander M. Nicolson and Richard M. Mara.

(4) U.S. Pat. 4,743,906; entitled, "Time Domain Radio Transmission System", by Larry W. Fullerton.

(5) U.S. Pat. 3,662,316; issued May 9, 1972, entitled, "Short Baseband Pulse Receiver", by Kenneth W. Robbins.

RELATED APPLICATION (1) U.S. patent application, Ser. No. 07/715,546; filed Jun. 14, 1991, entitled, "Short Pulse Microwave Source With a High PRF and Low Power Drain", by Gerald F. Ross, Richard M. Mara, and Kenneth W. Robbins.

DESCRIPTION OF THE PRIOR ART

1. Field of the Invention

This invention relates generally to the field of radar and communication receivers and more particularly, to the reception of very short pulse microwave radiation or ultra-wideband (UWB) signals.

2. Description of Prior Art

It is difficult to detect pulse packets of very short duration microwave energy; for example, durations in the order of 1 ns or less. These signals may contain only several cycles of microwave energy (see Referenced Application (1) above describing a 1 ns duration pulse burst with a nominal band center frequency of 2.5 GHz). Early devices to detect very short pulse bursts used avalanche transistors as a simple threshold detector which were not very sensitive (e.g., a 50 mV threshold sensitivity), to later a tunnel diode detector appropriately biased by a manual potentiometer adjustment (see Reference (5)). Using a manually biased tunnel diode, one could achieve a threshold sensitivity of 10-15 mV for a microwave pulse packet having a nominal center frequency of 1.5 GHz. Since the nonlinear and negative resistance properties of a tunnel diode change with temperature, one could not safely approach or maintain the point of maximum sensitivity T; that is, the current or voltage where the stable state of the tunnel diode switched from one stable state A to the next C, as shown in FIG. 1.

U.S. Pat. No. 3,755,696, issued to Nicolson and Brophy (Reference (2)), and U.S. Pat. No. 3,983,422, issued to Nicolson and Mara (Reference (3)), significantly improved the threshold sensitivity to just several mV by the use of a constant false alarm rate (CFAR) feedback loop to control the bias on the tunnel diode using thermal noise to always maintain the static operating point close to the negative resistance switching point regardless of temperature changes. A more detailed description of the operation of a CFAR single-hit receiver follows below.

The receiver uses an m out of n possible consecutive hits criteria to establish the detection of a target; that is, the use of a binary integration to establish detection. Other approaches to detect short pulse UWB signals involve mixing and correlating the returned signal with a replica of the transmitted waveform (see Reference Pat. (4)) using a multiplicity of hits. Detection occurs by threshold detecting on the output of the correlator.

OBJECTS OF THE INVENTION

The primary object of the subject invention is to increase the sensitivity of the tunnel diode CFAR binary integrator by several orders of magnitude.

It is an object of the invention to use an adjunct module to increase the sensitivity of the tunnel diode CFAR binary integrator.

It is another objective of this invention to ensure that the adjunct module has a low component and manufacturing cost and is simple to install.

It is still another objective of this invention to design the adjunct module in such a manner that it can be used to retrofit existing systems currently in the field.

SUMMARY OF THE INVENTION

The above objects and advantages are achieved in a preferred embodiment of the present invention. According to the preferred embodiment, this invention describes a means to detect the envelope of the microwave short pulse burst. It is indicated that a tunnel diode changes state (a detection event) when the area under the current vs. time waveform or charge, i.e., $\int idt$, exceeds a prescribed number of picocoulombs. When several oscillatory cycles of microwave energy are incident on the terminals of the receiver described in Reference 3, it is the algebraic sum of the positive or negative energy under each half-cycle (depending upon how the terminals of the tunnel diode are connected) that determines whether or not the tunnel diode switches from stable state A to C shown in FIG. 1. By using the envelope of the incident, the signal area is maximized as is the resulting sensitivity.

The envelope of the received signal is obtained by assuring that the transmitted signal is coherent with a microwave CW source by counting down to generate the transmit trigger. For example, if a 2 GHz clock is used as the CW reference source, then if one counts down by a factor of $2 \times 10^5$, a 10 kHz trigger signal can be derived to excite the transmitter. Since the output transmitted signal is in coherence with the trigger, then if the referenced microwave oscillator was mixed with the incoming target return, one could derive the so-called envelope signal. If the referenced oscillator/mixer was chosen so that its beat frequency was related to the duration of the transmitted pulse in such a way that only one-half cycle of baseband (positive or negative) energy resulted, then the area is maximized and the stated goal is accomplished. Both microwave preamplification prior to the mixer and baseband post-amplification, together with appropriate filtering, are required to establish the proper noise figure and receiver sensitivity levels.

DESCRIPTION OF THE PREFERRED EMBODIMENT

The instant invention substantially improves the threshold sensitivity of the basic tunnel diode CFAR binary integrator of the referenced U.S. Pat. No. 3,983,422 by a microwave front-end addition. Theoretically, a 10–20 dB improvement in receiver sensitivity is realized by the instant invention. In the laboratory using the waveform generated by the source described in the referenced application (Ser. No. 715,546), a 17 dB improvement in sensitivity is realized.

This invention also accomplishes increased sensitivity at a component cost much lower than that realized using coherent processing and correlation techniques.

Before describing the preferred embodiment of the subject invention, it is necessary to review in more detail the operation of the tunnel diode and the CFAR receiver.

To receive a signal with such an exceedingly small time duration, it is necessary to find a device which is capable of triggering on very fast, low energy pulses. This threshold device is the key element in the front end of any UWB receiver. Two such devices do exist—namely, the avalanche transistor and the tunnel diode (TD). Of the two, the TD holds an advantage in that its v-i characteristics are well defined and its sensitivity is almost an order of magnitude greater than that of the avalanche transistor.

Figure 2A:
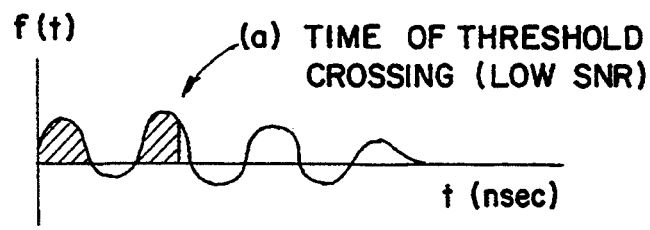
FIG. 2a Tunnel Diode Dynamic Switching Characteristics, Small Signal
Figure 2B:
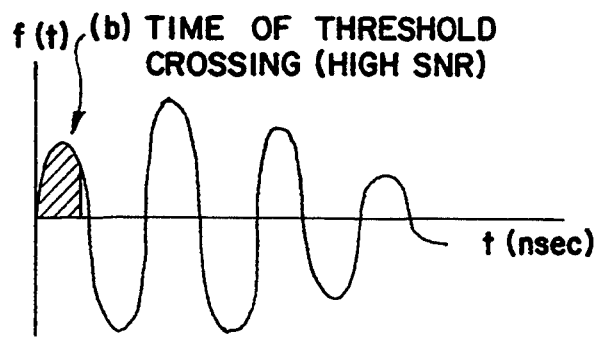
FIG. 2b Tunnel Diode Dynamic Switching Characteristics, Larger Signal

The TD can be operated in a bistable, monostable or astable (oscillator) mode. However, reliability is enhanced by operating the device in the bistable state. This requires that the device be reset after each detection. It was found experimentally that the TD will switch states only when the charge Q exceeds some threshold $q_0$; that is, $$Q = \int_0^{t_0} idt \geq q_0$$

where i is the current passing through the TD and $t_0$ is the pulse duration. Typically, when the signal-to-noise ratio (SNR) is low, there may be some degree of uncertainty as to which cycle of the RF input waveform will trigger the device (FIG. 2a). At higher SNRs, on the other hand, TD triggering will occur within the first RF half cycle (FIG. 2b).

Tunnel diode disadvantages (i.e., a temperature sensitive v-i characteristic, being a two-terminal device requiring that both input and output be obtained off the same terminals, and its bistable nature for best reliability requiring reset before another operation can be performed) can be obviated through the use of both analog and digital feedback techniques. For pulse position modulation applications, the TD can be gated off except for a range gate interval which can be as short as a couple of nanoseconds. During this range gate window, the diode can be biased to be sensitive to as little as several mV of incident RF energy; while outside of the range gate, the diode can hold off greater than 1½ volts of RF.

Figure 1:
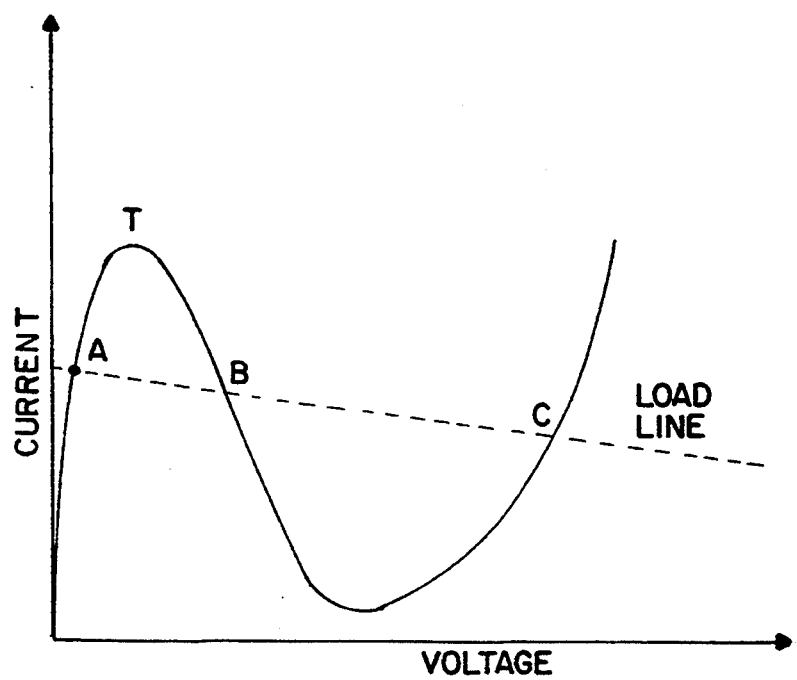
FIG. 1 Low Frequency Two-Terminal Properties of a Tunnel Diode

In the original use of the receiver of the referenced U.S. Pat. No. 3,983,422, an antenna element is connected through a balun to a low noise microwave amplifier; the output of the amplifier drives a TD element connected in a CFAR loop. The object of the closed loop is to maintain the operating point at point A in FIG. 1, where point A is as close as possible to the switching point T of the curve (Note: because of the negative resistance properties of the TD, only points A and C are stable points). The sensitivity of the TD increases as the load line approaches the point T at the expense of noise spikes creating false alarms.

Figure 3:
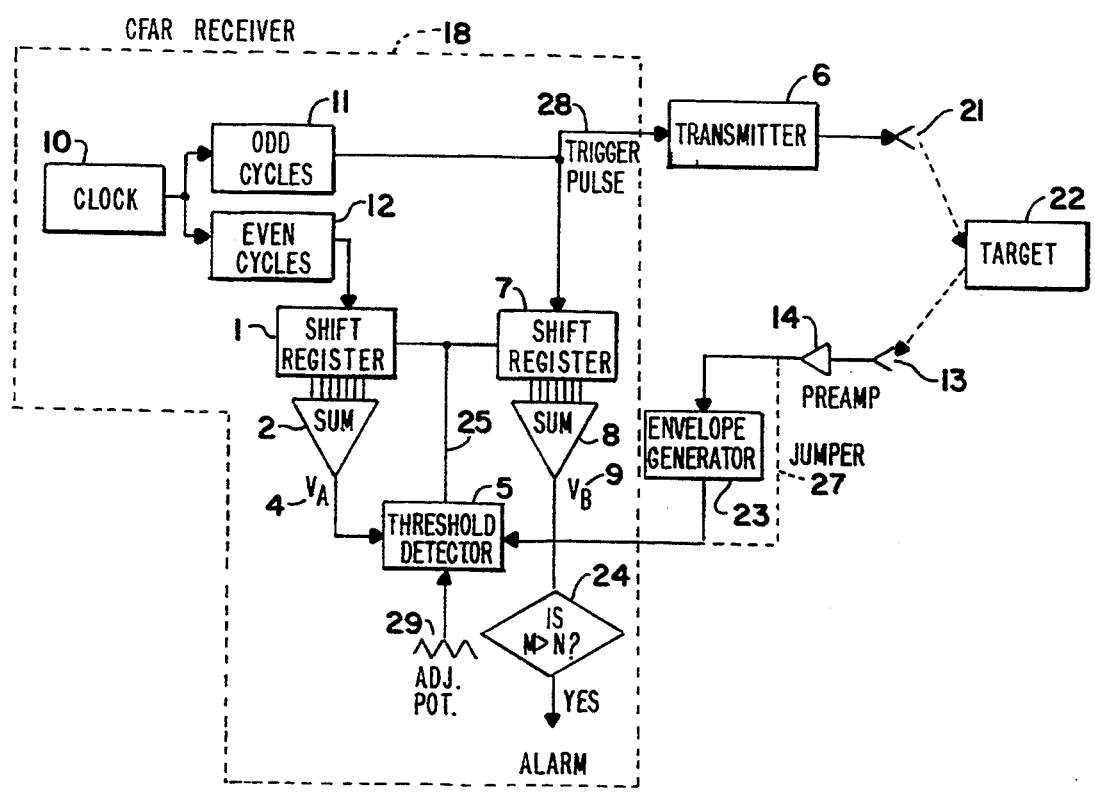
FIG. 3 A Tunnel Diode CFAR Threshold Receiver

A block diagram of a CFAR receiver 18, a transmitter 6, and a target 22 is shown in FIG. 3. Transmitter 6 sends a signal via an antenna 21 to the target 22. The reflected signal is received by a threshold detector 5 via an antenna 13 and a microwave preamplifier 14. This invention replaces jumper 27 by a tunnel diode envelope generator 23 between the microwave preamplifier 14 and the threshold detector 5.

In receiver 18, a system trigger is generated by a dock 10 which triggers the transmitter 6 on odd counts generated by a counter 11 or gates a shift register 1 on even counts generated by a counter 12. If the hits obtained from noise alone are fed to register 1 from threshold detector 5, register 1 then assigns a +1 each time a noise spike exceeds a threshold and a zero when it does not, then the outputs from, say, 32 stages of register 1 can conveniently be summed by a sum network 2. By appropriately feeding the register 1, a sliding average of detector hits in any group of 32 consecutive periods, M, can be obtained as shown by waveform 3 in FIG. 3a. The threshold can be arbitrarily lowered by a potentiometer 29 within a closed feedback loop via connection 25 until, on the average, two or three hits due to noise alone are contained in the register 1; the transmitter is disabled during this time.

A dc voltage derived from an output port 4 of sum network 2 is used via feedback loop 25 to automatically maintain, on the average, an arbitrary number of pulses in the register 1 due to noise. This loop 25 sets the constant bias current through a TD threshold detector 5 in the absence of signal (i.e., on alternate pulse-repetition periods when the transmitter 6 is disabled).

When the transmitter 6 is enabled, the threshold for establishing the presence of a target 22 is set in a separate shift register 7 and a sum network 8. For example, the target 22 is said to be present by decision block 24 when 27 or more of the 32 stages of the register 7 are filled as shown by waveform 9 in FIG. 3b where the alarm rate is identified as N and M =32. The probability of having a false alarm, $P_{FA}$, during the period of M transmissions, is given by $P_{FA}(M)=(1/16)^m$, where it is assumed that 2 noise spikes out of 32 chances exceed the alarm level, N.

Figure 4:
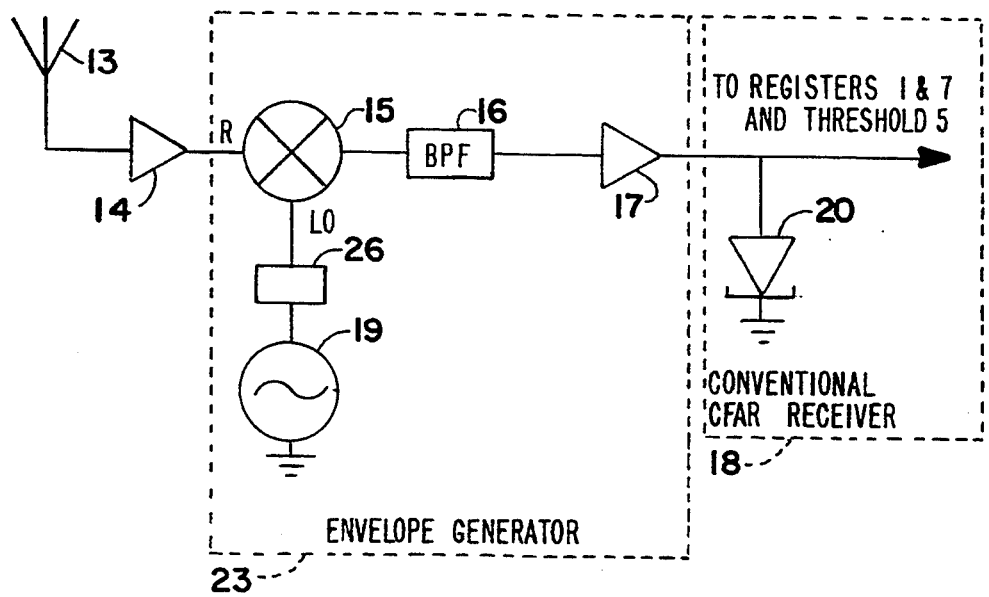
FIG. 4 A Tunnel Diode Superheterodyne CFAR Receiver

To maximize the charge incident on the tunnel diode in the threshold detector 5 for more sensitivity, the subject invention, in effect, converts the tunnel diode CFAR receiver 18 shown in FIG. 4 into a special fore of superheterodyne receiver 23.

FIG. 4 shows the Tunnel Diode envelope generator 23, a form of superheterodyne addition, and the CFAR receiver 18. The output of the antenna 13 is fed to the microwave preamplifier 14 as before to establish the required signal noise figure. In the case of the subject invention, the output of the preamplifier 14 is fed to a port R of a mixer 15. The other input to a local oscillator (LO) port of the mixer 15 is a CW microwave signal from a source 19 whose frequency is carefully selected so that only a portion of the envelope of the microwave pulse package received by the antenna 13 will appear at the output terminals of the mixer 15. The output of the mixer 15 is fed to a bandpass filter (BPF) 16 which selects only the difference frequency signal to be incident on the terminals of a baseband IF amplifier 17. For example, if the received transmission has a duration of 1 ns and a nominal center frequency of 2.5 GHz, then the choice of a 2 GHz oscillator 19 produces a difference frequency of 500 MHz at the output of the BPF 16. Attenuator 26 is selected to minimize the conversion loss of the mixer 15. A 500 MHz signal has a period of 2 ns, but since the total duration of the signal is only 1 ns, the resulting signal incident on the input terminals of the IF amplifier 17 can only be a baseband or video pulse with varying positive or negative amplitude, depending upon the position of the target 22 with respect to the radar. As the target 22 moves closer to the radar, the output from the baseband IF amplifier 17 will have a positive peak, a null, and a negative peak. Depending upon the connection of the tunnel diode 20 in the CFAR receiver 18, the threshold detector 5 of FIG. 3 will respond to either polarity. As shown by the TD 20 configuration in FIG. 4, only the positive peak of the transmission will trigger the tunnel diode threshold detection. Associated with TD 20 are embedded ancillary resistors and capacitors to supply appropriate biasing and bypassing, respectively, to TD 20.

To ensure coherence, it is necessary that the transmitter trigger 28 be derived from the same microwave CW source 19 by using a digital countdown chain. For example, for the 2 GHz source 19 described above, 2 GHz $\div 2 \times 10^5$ will produce a 10 kHz system pulse repetition frequency (PRF).

The trigger pulse that is used to activate the transmitter 6 is derived by counting down from the CW oscillator 19 so that the output of the bandpass filter 16 is synchronous with the received transmission arriving at the antenna 13.

Although it is not generally known, it was found by laboratory experiment that tunnel diode sensitivity, especially for received signals buried in noise, can be improved dramatically by increasing the charge passing through the two-terminal device. The kernel of the subject invention maximized the charge by creating only a one-half cycle of rf energy or a baseband pulse which has a unipolarity.

It is difficult to calculate the advantage of using the proposed superheterodyne receiver scheme as opposed to the direct detection scheme because of the nonlinear behavior of the TD 20 in the presence of noise. However, it is possible to estimate its potential advantage by considering, by example, two simple waveforms incident on the TD 20 without noise. The first waveform, f(t), is a pulse modulated wave packet approximating the received signal; the second signal, f̂(t), is the envelope of the pulse packet. In the absence of circuit lead inductance and distributed capacity (which tend to establish an additional dc level), the ideal TD detector changes states when the charge or number of picocoulombs, $q_0$, passing through the device exceeds a prescribed threshold, as indicated earlier. Thus, the area of the incident voltage across the TD is a critical measure for the detection of small signals.

Figure 5:
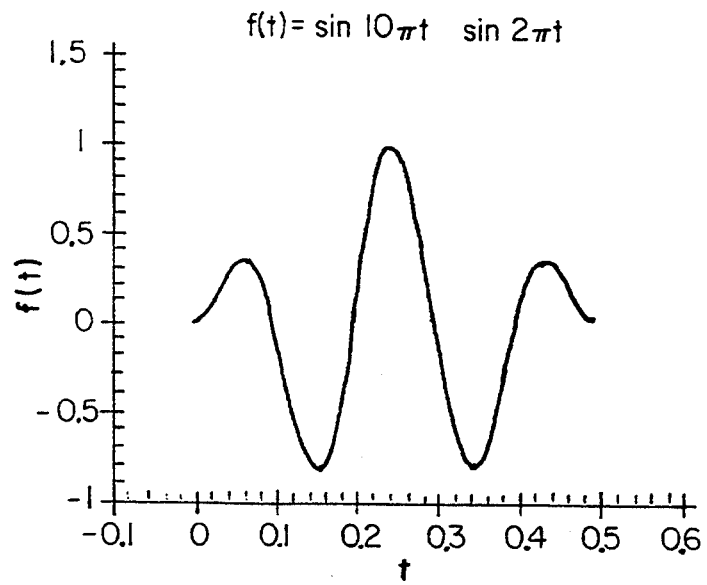
FIG. 5 Approximate Normalized Received Waveform

If f(t) is normalized, and given by the function $$f(t) = (\sin 10\pi t) \cdot (\sin 2\pi t) \text{ for } 0 \leq t \leq \tfrac{1}{2}$$

as shown in FIG. 5, then the envelope function is given by $$\hat{f}(t) = \sin 2\pi t \text{ for } 0 \leq t \leq \tfrac{1}{2}.$$

For large signal strengths, the TD switches state during the first half cycle. As the signal level drops detection may take place during the first or next positive half cycle. After that the area begins to decrease so that no detection can result.

The area of the envelope function is $$A_e = \int_0^{\frac{1}{2}\pi} \hat{f}(t)dt = \int_0^{\frac{1}{2}} \sin 2\pi t\, dt = \int_0^{\pi} \sin x\, dx = \frac{1}{\pi}$$

The maximum positive area that can be achieved by integrating f(t) occurs when t = 0.3 or $$\int_0^{0.3} f(t)dt = \int_0^{0.3} \sin 2\pi t (\sin 10\pi t) dt$$

$$= \int_0^{0.6\pi} \sin x \sin 5x\, dx = \left.\frac{\sin 4x}{8} - \frac{\sin 5x}{10}\right|_0^{0.6\pi}$$

$$A_{inc} = \frac{0.95}{8} = 0.12.$$

Therefore, the potential voltage gain by using the superheterodyne scheme is conjunction with the TD is given by $$G = A_e/A_{inc} = 2.65 \text{ or about } 8.5 \text{ dB}.$$

Figure 6:
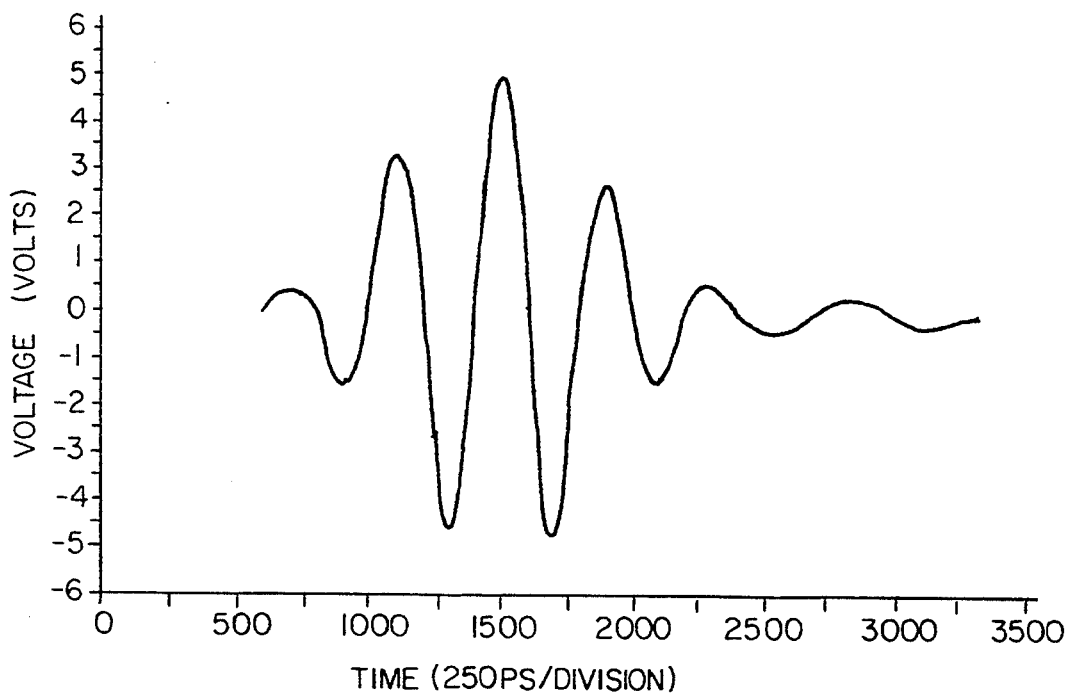
FIG. 6 Actual Received S-band Waveform of Preferred Embodiment at a scale of 250 ps/div FIG. 7a-7d Circuit Waveforms in Subject Invention FIG. 8. UWB Microwave Communication Link

Using the actual waveform generated and received as described in Reference 4 and in FIG. 6, one can estimate the area of the envelope by a sampled-data approximation as shown in Table 1. Here the apparent increase in sensitivity appears to be somewhat less than 20 dB. In fact, the waveform shown in FIG. 6 does not contain a pure 2.5 GHz monotone, but has some frequency modulation. The result is that one cannot realize a pure half-cycle of baseband energy, but must accept a small undershoot (overshoot). In the preferred embodiment of the invention described below the actual increase in sensitivity was measured to be 17 dB.

TABLE 1

| Sampled Data From Received Waveform | | |
|---|---|---|
| Cycle | A, Peak Amplitude, $A_i$ (normalized units) | $\Sigma A$; Area for Tunnel Diode Detection |
| ½ | +0.49 | |
| 1 | −1.65 | |
| 1½ | +3.4 | |
| 2 | −4.71 | $\Sigma A_i$ |
| 2½ | +5.1 | 2.63 |
| 3 | −4.9 | |
| 3½ | +2.77 | |
| 4 | −1.65 | $\Sigma \|A_i\|$ |

TABLE 1-continued

| | Sampled Data From Received Waveform | |
|---|---|---|
| Cycle | A, Peak Amplitude, $A_i$ (normalized units) | $\Sigma A$; Area for Tunnel Diode Detection |
| 4½ | −0.63 | 25.3 |

Potential Increase in Sensitivity = $20 \log \frac{\Sigma |A_i|_2}{\Sigma A_i} = \frac{25.3}{2.63} = 19.66$ dB Note: $\Sigma |A_i|$ is the envelope function.

In the preferred embodiment of the invention, the S-band preamplifier 14 of FIG. 4 has a gain of 34 db. An Avantek model AFT 4233 having a 2–4 GHz bandwidth is adequate to amplify without dispersion of the spectral components of the received pulse. The output of the preamplifier 14 is fed to port R of mixer 15 which is similar to Mini Circuits type ZFM4212. The other port LO of the mixer 15 is driven by an EMF Systems P/N 52747 mW microwave source 19 in series with an attenuator 24 of approximately 20 dB. The output of mixer 15 feeds LPF 16 similar to a Cirqutel LT 13-900AA unit with a lowpass of 900 MHz. The output of the filter 16 is fed to a baseband video amplifier 17 with a bandwidth of 500 MHz similar to Mini Circuits model 2F500 having a gain of 34 dB. The output from the baseband preamplifier 17 with a matched 50 ohm output impedance is fed directly to the TD CFAR receiver 18.

Figure 3A:
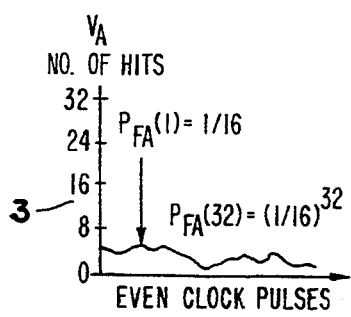
FIG. 3a CFAR Circuit Waveform
Figure 3B:
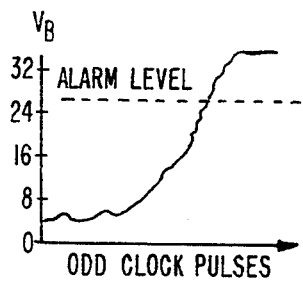
FIG. 3b CFAR Circuit Waveform

It should be noted that without the subject invention in place the receiver 18 has an optimum sensitivity based on the gain and noise figure of the selected preamplifier(s). Increasing the gain, for example, beyond an experimentally obtained optimum value of 40 dB results in no increase in receiver sensitivity because the thermal noise generated within preamplifier 14 begins to reduce the TD bias so that a constant false alarm rate based on noise spikes exceeding the tunnel diode 20 threshold, as shown in FIG. 3a, is maintained by the closed loop. In other words, increasing the receiver gain by 3 dB simply reduces the bias such that the same level of microwave signal at the antenna terminals will fill the target register 8 indicating detection. For the CFAR receiver 18, employing a type TD262A tunnel diode, the optimum preamplifier gain of 40 dB results in a minimum of discernable signal (MDS) of about 60 μvolts at the antenna 13 output terminals. In practice, the optimum gain of 40 dB is obtained by placing two preamplifiers in cascade, separated by an appropriate value of attenuation. The addition of the superheterodyne front-end envelope generator 23 described in the subject invention which produces one-half cycle of baseband energy improves the sensitivity by approximately 17 dB, resulting in a MDS of somewhat less than 10 μvolts.

Figure 8:
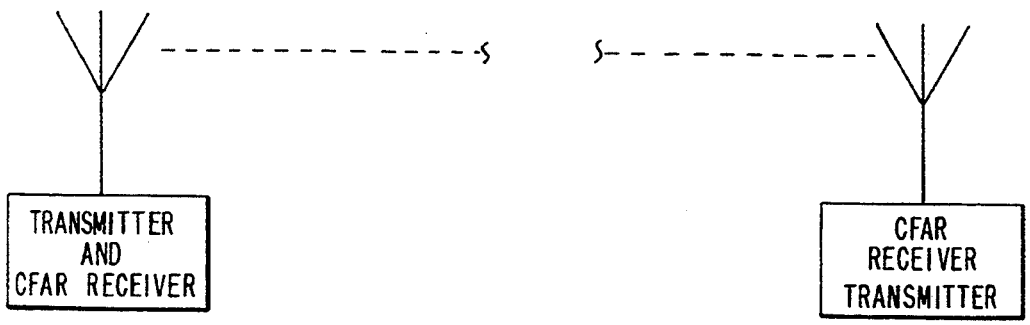

FIG. 7 shows the approximate circuit waveforms incident and within the envelope generator 23. The waveform received by antenna 13 is just several cycles of microwave energy (FIG. 7a). It is amplified by the microwave preamplifier 14 having a gain A in FIG. 7b. It is beat with CW oscillator 19 after being attenuated by attenuator 26 to achieve the minimum mixer 15 loss. The output of the mixer 15 consists of the incident amplified microwave signal (FIG. 7b), the CW source frequency 19, and the sum and difference of both these signals. BPF 16 selects the difference frequency which, because of the choice of CW source frequency 19 and the duration of the incident signal, $\tau$, is precisely a baseband unipolar pulse shown in FIG. 7c. Note that the amplitude of the pulse also depends on the conversion loss of the mixer 15. The resulting signal in FIG. 7c is amplified, the baseband IF amplifier 17 with a gain B is shown in FIG. 7d. This is the signal as opposed to FIG. 7b that is incident on the TD CFAR receiver. Although the subject invention was specifically described as a front-end improvement for a radar receiver, it is clear to one skilled in the state-of-the-art that the invention may also be used as part of transceiver link, as shown in FIG. 8. FIG. 8 depicts an A to B and B to A link using the subject invention to improve the range of the communications link. A separate synchronization module 30 of each transceiver 31 converts the sequence of unipolar pulses to information. An almost 20 dB improvement in the receiver sensitivity in the communication mode, as provided by the subject invention, extends the range of the link by about a factor of 10. Transceivers A and B each contains modules 6, 13, 18, 21, and 23 described earlier as well as synchronizer network 30.

While the invention has been shown and described with reference to the preferred embodiment thereof, it will be understood by those skilled in the art that the above and other changes in form and detail may be made therein without departing from the spirit and scope of the invention.

We claim:

1. A system for receiving ultra-wideband (UWB) signals, said system comprising:
   means for receiving oscillatory short pulse microwave signal bursts;
   preamplifier means coupled to said receiving means for amplifying each of said oscillatory short pulse microwave signal bursts;
   oscillator means for generating an attenuated microwave signal at a predetermined frequency;
   mixing means, coupled to said preamplifier means and said oscillator means, and responsive to said oscillatory short pulse microwave signal bursts and said attenuated microwave signal at said predetermined frequency for generating an envelope signal equal to the sum and difference between said attenuated microwave signal bursts wherein said predetermined frequency is selected such that a video or baseband pulse at the output of said mixing means has a maximum positive area at some time;
   bandpass filter means coupled to said mixing means and responsive to said envelope signal to generate a baseband unipolar pulse for said each of said oscillatory short pulse microwave signal bursts;
   IF amplifier means coupled to said bandpass filter means for amplifying each of said baseband unipolar pulses;
   tunnel diode means coupled to said IF amplifier means and responsive to each of said amplified baseband unipolar pulses for maximizing the sensitivity of said tunnel diode means by maximizing the charge through a junction since said each of said amplified baseband unipolar pulses provides an envelope of said amplified burst of microwave energy which in its net charge through the junction exceeds a prescribed number of picocoulombs.

2. The system of claim 1 wherein said each of said oscillatory short pulse microwave signal bursts has a one nanosecond or less duration with a nominal band center frequency of 2.5 GHz.

3. The system of claim 1 wherein said predetermined frequency is 2 GHz and the frequency of said baseband unipolar pulses is 500 MHz.

4. The system of claim 1 wherein amplified baseband unipolar pulses have a positive peak in the order of 2 volts.

5. A radar system for detecting a target comprising:
transmitter means for sending oscillatory radar signal bursts toward said target;
antenna means for receiving reflected oscillatory radar signal bursts from said target;
preamplifier means coupled to said antenna means for amplifying said reflected oscillatory radar signal bursts;
envelope generator means coupled to said preamplifier means and responsive to said reflected oscillatory radar signal bursts for generating a unipolar pulse for each of said reflected oscillatory radar signal bursts, said envelope generator means including means for maximizing said unipolar pulse;
a tunnel diode constant false alarm rate (CFAR) receiver coupled to said envelope generator means for receiving each of said unipolar pulses for greater system sensitivity.

6. The system of claim 5 wherein each of said oscillatory radar signal bursts has a one nanosecond or less duration with a nominal band center frequency of 2.5 GHz and has a 10 kHz or greater system pulse repetition rate.

7. A microwave system for detecting a target comprising:
a constant false alarm rate receiver (CFAR) includes,
clock means for generating a free running cyclical clock signal,
timing means coupled to said clock means and responsive to said clock signal for generaling an odd cyclical timing signal representing even cycles,
transmitting means having an active state and a disabled state, said transmitting means being coupled to said timing means and responsive to said odd cyclical timing signal for sending out oscillatory short pulse microwave signal bursts having a predetermined duration on odd cycles when in said active state,
threshold detecting means generating noise spikes when said transmitting means is in said disabled state during said even cycles,
first register means coupled to said timing means and said threshold detecting means and having a first predetermined number of stages for receiving said noise spikes during said first predetermined number of consecutive even cycles and having first means for generating a count of said noise spikes received during said first predetermined number of consecutive even cycles, said threshold detecting means coupled to said first register means for receiving said count, said threshold detecting means including threshold adjusting means for setting said predetermined amplitude so that said count is at a second predetermined number thereby setting a constant bias current; and
envelope generator means coupled to said transmitting means for receiving bursts of several cycles of microwave energy having said predetermined duration when said transmitting means is in said active state and generating an amplified baseband unipolar pulse for each of said bursts, said envelope generator means including a tunnel diode responsive to said unipolar pulse for maximizing the sensitivity of said tunnel diode since the net charge through the junction exceeds a prescribed number of picocoulombs, said envelope generator means including means for maximizing said unipolar pulse;
said threshold detector means coupled to said envelope generator means for receiving each of said unipolar pulses and generating a signal for said each of said unipolar pulses having an amplitude greater than said constant bias current;
second register means, having said predetermined number of stages, coupled to said timing means and said threshold detector means and responsive to said odd cyclical timing signal for receiving said signals during said first predetermined number of said signals is received during said first predetermined number of said odd cycles.

8. The microwave system of claim 7 wherein said first predetermined number is 32, said second predetermined number is 3 or less on an average, and said third predetermined number is arbitrarily set at 27.

9. A microwave system for detecting a target comprising:
means for generating a sequence of oscillatory short pulse microwave signal bursts;
antenna means coupled to said generating means, said antenna means including means for transmitting said sequence of oscillatory short pulse microwave signal bursts to a target area and means for amplifying a sequence of reflected oscillatory short pulse microwave signal bursts reflected from said target;
envelope generator means coupled to said antenna means for converting said amplified sequence of reflected oscillatory short pulse microwave signal bursts received from said antenna means to a sequence of unipolar pulses, each of said unipolar pulses corresponding to a respective reflected oscillatory short pulse microwave signal burst, said envelope generator means including means for maximizing said unipolar pulse;
CFAR means, including tunnel diode means, coupled to said envelope generator means for receiving said sequence of unipolar pulses wherein said each of said unipolar pulses encompasses a greater area than its corresponding oscillatory burst, thereby increasing system sensitivity.

10. A microwave communication system, comprising:
a CFAR receiver for generating a cyclical timing signal;
a microwave transmitter coupled to said CFAR receiver and responsive to said cyclical timing signal for sending information in the form of a sequence of oscillatory short pulse microwave signal bursts;
a microwave link coupled to said transmitter for carrying said sequence of oscillatory short pulse microwave signal bursts;
an envelope generator coupled to said microwave link for receiving said sequence of oscillatory short pulse microwave signal bursts for conversion to a sequence of unipolar pulses;
said CFAR receiver coupled to said envelope generator for receiving said sequence of unipolar pulses and having means for converting said sequence of unipolar pulses to said information, wherein each of said unipolar pulses generates more energy than its corresponding oscillatory burst, thereby increasing system sensitivity.

* * * * *